(12) United States Patent
Wada et al.

(10) Patent No.: US 9,973,735 B2
(45) Date of Patent: May 15, 2018

(54) CAMERA APPARATUS AND METHOD OF CONTROLLING CAMERA APPARATUS

(71) Applicant: PANASONIC CORPORATION, Osaka (JP)

(72) Inventors: Jyouji Wada, Kanagawa (JP); Masahito Oka, Fukuoka (JP); Yoshihito Urashima, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 405 days.

(21) Appl. No.: 14/182,638

(22) Filed: Feb. 18, 2014

(65) Prior Publication Data

US 2014/0240494 A1 Aug. 28, 2014

(30) Foreign Application Priority Data

Feb. 22, 2013 (JP) ................................. 2013-033649
Dec. 6, 2013 (JP) ................................. 2013-252902

(51) Int. Cl.
*H04N 5/232* (2006.01)
*H04N 7/18* (2006.01)
*G08B 13/196* (2006.01)

(52) U.S. Cl.
CPC ......... *H04N 7/183* (2013.01); *G08B 13/1963* (2013.01); *H04N 5/232* (2013.01)

(58) Field of Classification Search
CPC ..... G08B 13/1963; H04N 5/232; H04N 7/183
(Continued)

(56) References Cited

U.S. PATENT DOCUMENTS 5,745,166 A 4/1998 Rhodes et al.
5,923,364 A 7/1999 Rhodes et al.
(Continued)

FOREIGN PATENT DOCUMENTS

CN 102450023 5/2012
JP 07-218981 8/1995
(Continued)

OTHER PUBLICATIONS

U.S. Appl. No. 14/188,752 to Jyouji Wada et al., filed Feb. 25, 2014.
(Continued)

*Primary Examiner* — Mohammed Rahaman
*Assistant Examiner* — James Boylan
(74) *Attorney, Agent, or Firm* — Greenblum & Bernstein, P.L.C.

(57) ABSTRACT

A camera apparatus includes a rotatable camera unit; a filter unit which is configured to selectively take at least one of a covering state and a standby state, wherein the covering state covers a light incident portion of the camera unit with a filter and the standby state removes the filter from the light incident portion; a controller which is configured to control a rotation of the camera unit and a state of the filter unit; and a memory which stores posture information including a direction of the camera unit and filter information representing at least one of the covering state and the standby state of the filter unit. The controller controls the direction of the camera unit based on the posture information stored in the memory and controls the filter unit based on the filter information stored in the memory.

14 Claims, 8 Drawing Sheets

(58) Field of Classification Search
USPC .......................................................... 348/143
See application file for complete search history.

(56) References Cited

U.S. PATENT DOCUMENTS

| | | | | |
|---|---|---|---|---|
| 5,956,536 | A * | 9/1999 | Dow | G03B 7/16 396/164 |
| 6,166,763 | A | 12/2000 | Rhodes et al. | |
| 6,867,798 | B1 * | 3/2005 | Wada | H04N 7/183 348/143 |
| 8,899,849 | B2 * | 12/2014 | Wada | G03B 17/561 396/427 |
| 2005/0141117 | A1 | 6/2005 | Kim et al. | |
| 2006/0291075 | A1 * | 12/2006 | Nomura | G03B 17/04 359/700 |
| 2008/0165272 | A1 | 7/2008 | Toguchi | |
| 2010/0157082 | A1 * | 6/2010 | Katerberg | G02B 27/281 348/222.1 |
| 2013/0223834 | A1 * | 8/2013 | Jikihara | G03B 11/00 396/448 |

FOREIGN PATENT DOCUMENTS

| | | | | |
|---|---|---|---|---|
| JP | 09-266572 | | 10/1997 | |
| JP | 2000-002921 | | 1/2000 | |
| JP | 2001-069495 | | 3/2001 | |
| JP | 2001-100296 | | 4/2001 | |
| JP | 2001100296 | * | 4/2001 | ............... G02B 7/02 |
| JP | 2002-016838 | | 1/2002 | |
| JP | 2005-198242 | | 7/2005 | |
| JP | 2006-148353 | | 6/2006 | |
| JP | 2006-208714 | | 8/2006 | |
| JP | 2006-325070 | | 11/2006 | |
| JP | 2007-003970 | | 1/2007 | |
| JP | 2008-165142 | | 7/2008 | |
| JP | 2011-013965 | | 1/2011 | |
| JP | 2011-017827 | | 1/2011 | |
| JP | 2012-103452 | | 5/2012 | |
| JP | 2012103452 | * | 5/2012 | ............. G03B 11/00 |
| JP | 2012-189826 | | 10/2012 | |

OTHER PUBLICATIONS

International Search Report and Written Opinion in PCT/JP2014/054986, dated May 9, 2014.
Office Action issued in Counterpart Japan Patent Application No. 2013-252902, dated Nov. 15, 2016, along with an English language translation thereof.
Office Action issued in Counterpart China Patent Application No. 201480009980.X, dated Aug. 25, 2017, along with an English language translation thereof.
Japan Office Action, dated Dec. 19, 2017, in counterpart Japan Patent Application No. 2013-252902, together with an English language translation thereof.
China Office Action, dated Jan. 25, 2018, in counterpart China Patent Application No. 201480009980.X, together with an English language translation thereof.

* cited by examiner

FIG.5

| PRESET NO. | POSTURE INFORMATION | | | | POLARIZATION FILTER INFORMATION | |
|---|---|---|---|---|---|---|
| | P | T | Z | F | ON/OFF | POLARIZATION ANGLE $\theta$ deg |
| 1 | P1 | T1 | Z1 | F1 | OFF | — |
| 2 | P2 | T2 | Z2 | F2 | ON | $\theta 2$ |
| 3 | P3 | T3 | Z3 | F3 | OFF | — |
| ... | ... | ... | ... | ... | ... | ... |
| n | ... | ... | ... | ... | ... | ... |

CAMERA APPARATUS AND METHOD OF CONTROLLING CAMERA APPARATUS

BACKGROUND

1. Field of the Invention

The present invention relates to a camera apparatus such as a surveillance camera and a method of controlling the camera apparatus which uses a filter such as a polarization filter and is required to obtain an optimum image in a short time.

2. Description of the Related Art

There has been used a camera apparatus which obtains external information by processing an image imaged using a polarization filter (see JP-A-9-266572, for example).

The camera apparatus disclosed in JP-A-9-266572 is mounted on a vehicle and used to obtain external information by imaging a subject outside of the vehicle.

As shown in FIG. 8, a camera apparatus 100 is a CCD (Charge Coupled Device) camera and provided with a CCD 101 as an image pickup device. An objective lens system 102, as an imaging optical system for imaging a subject image on the imaging area of the CCD 101, is disposed on the front side of the CCD 101.

On the front surface side of the objective lens system 102, a polarization filter 103, which transmits only a light beam of predetermined polarization component to thereby eliminate an unnecessary light beam, is provided within an optical path. The polarization filter 103 can be inserted and removed freely.

Further, in the optical path of the objective lens system 102 (rear surface side of the objective lens system 102 in FIG. 8), a conversion lens 104 as a focus switching lens for changing the focal length of the objective lens system 102 is provided. The conversion lens 104 can be inserted and removed freely.

The polarization filter 103 is disposed in the optical path as needed and located at a proper polarization position by being rotated suitably.

Thus, a ghost reflection image, such as an image of the upper portion of an instrument panel or a dashboard within the vehicle interior, imaged on a front window can be prevented from entering into the objective lens system 102 and the CCD 101.

Further, a degree of the ghost imaged into the camera apparatus 100 can be reduced.

SUMMARY

In the camera apparatus 100 described in JP-A-9-266572, since the polarization filter 103 is positioned at the proper polarization position while being rotated little by little, it takes a long time to set the polarization filter.

Thus, the camera apparatus has a problem of not being suitable for a camera, such as a surveillance camera provided with a rotating table, which is required to pick-up images in various imaging directions while moving the imaging direction.

The present invention is made in order to solve the problem. An object of the present invention is to provide a camera apparatus and a method of controlling the camera apparatus which moves an imaging direction and can pick-up an image suitably in a short time using a filter such as a polarization filter.

An aspect of the present invention provides a camera apparatus including: a rotatable camera unit which includes a light incident portion; a filter unit which is configured to selectively take at least one of a covering state and a standby state, wherein the covering state covers the light incident portion of the camera unit with a filter and the standby state removes the filter from the light incident portion; a controller which is configured to control a rotation of the camera unit and a state of the filter unit; and a memory which stores posture information at least including a direction of the camera unit and filter information representing at least one of the covering state and the standby state of the filter unit, wherein the controller controls the direction of the camera unit based on the posture information stored in the memory and controls the filter unit based on the filter information stored in the memory.

The camera apparatus may be configured so that the filter is a polarization filter.

The camera apparatus may be configured so that the camera unit is rotatable at least in two directions.

The camera apparatus may be configured so that the controller switches the state of the filter unit to one of the covering state and the standby state based on the filter information stored in the memory.

The camera apparatus may be configured so that the controller rotates the filter around an imaging axis line of the camera unit based on the filter information stored in the memory.

The camera apparatus may be configured so that the filter information stored in the memory includes a filter angle of the filter with respect to a reference angle of the filter, and the controller rotates the filter around the imaging axis line of the camera unit to the filter angle included in the filter information stored in the memory.

Another aspect of the present invention provides a method of controlling a camera apparatus, the method including: causing a filter unit to select at least one of a covering state and a standby state, wherein the covering state covers a light incident portion of a rotatable camera unit with a filter and the standby state removes the filter from the light incident portion; storing posture information including a direction of the camera unit and filter information representing at least one of the covering state and the standby state of the filter unit; and controlling the direction of the camera unit based on the stored posture information and controlling the filter unit based on the stored filter information.

According to the present invention, the controller controls the direction of the camera unit based on the posture information stored in the memory and also controls the filter based on the filter information stored in the memory. Thus, the camera apparatus and the control method of the camera apparatus can be provided each of which can image the subject to be imaged suitably in a short time by moving the imaging direction to a subject to be imaged and setting the filter.

BRIEF DESCRIPTION OF THE DRAWINGS

In the accompanying drawings:

FIG. 5 is a table showing data stored in a memory;

DETAILED DESCRIPTION

First Embodiment

Hereinafter, a camera apparatus according to a first embodiment of the present invention will be explained with reference to drawings.

Figure 1:
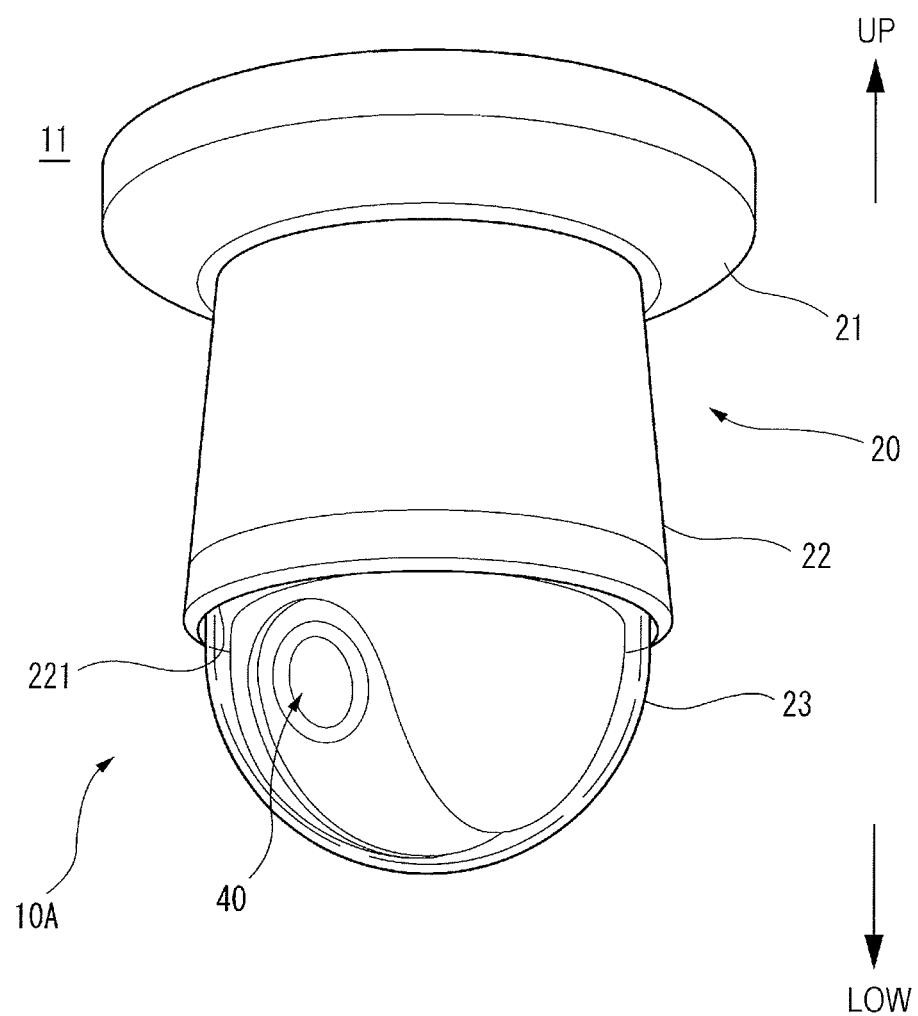
FIG. 1 is an entire perspective view of a camera apparatus seen from the lower direction thereof according to a first embodiment of the present invention.

As shown in FIG. 1, a camera apparatus 10A according to the first embodiment is attached to a ceiling surface 11 as a mounting surface, for example, and can be used as a surveillance camera capable of monitoring over 360 degree downward from the ceiling surface 11.

In the following explanation, the ceiling surface 11 side is explained as "up", whilst the opposite side of the ceiling surface 11 is explained as "low"

The camera apparatus 10A has a camera body 20 attachable to the ceiling surface 11. The camera body 20 has a disc-shaped base 21 attached to the ceiling surface 11, a housing unit 22 of an almost cylindrical shape attached to the lower side of the base 21, and a transparent hemispherical cover 23 covering the opening 221 of the housing unit 22.

Figure 2:
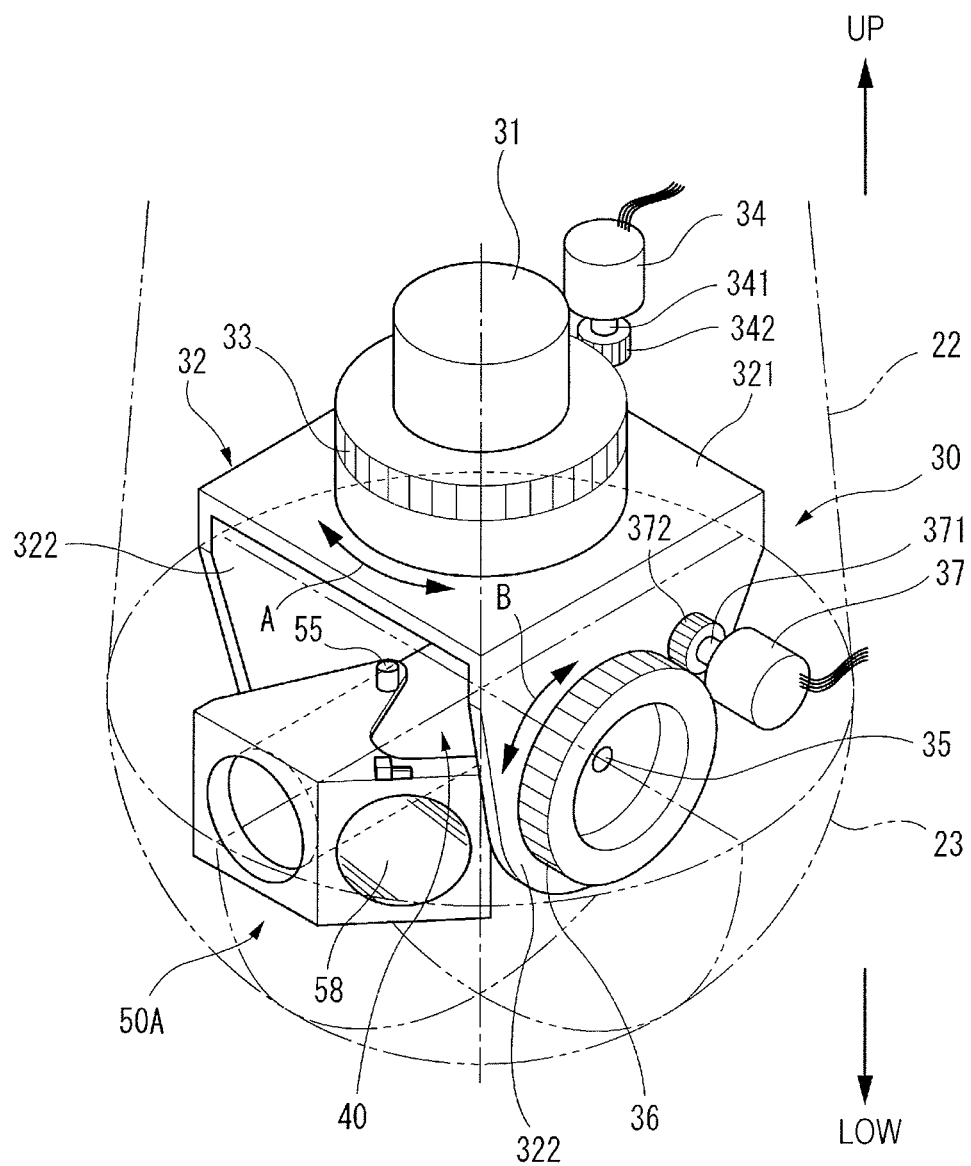
FIG. 2 is a perspective view of a mechanism contained within a camera body of the camera apparatus seen from the upper direction thereof according to the first embodiment of the present invention.

As shown in FIG. 2, the camera body 20 contains an inner mechanism 30. The inner mechanism 30 contained within the housing unit 22 of the camera body 20 is housed within the housing unit 22 and has a first rotating shaft 31 perpendicular to the ceiling surface 11.

A supporting member 32, rotatable in a direction shown by an arrow A with respect to the camera body 20 around the first rotating shaft 31, is attached to the lower end portion of the first rotating shaft 31. The upper end portion of the first rotating shaft 31 is fixed to the base 21 or the top portion of the housing unit 22.

The supporting member 32 is configured in a U-shape as a whole and has a top panel 321 and a pair of side panels 322, 322. The pair of side panels 322, 322 oppose to each other and extend downward from the top panel 321. A gear portion 33, having a diameter larger than that of the first rotating shaft 31, is provided so as to rotate integrally with the supporting member 32, at the periphery of the first rotating shaft 31 on the upper side of the top panel 321. A first motor 34 is attached to the housing unit 22 of the camera body 20. A gear 342 meshing with the gear portion 33 is attached to the rotating shaft 341 of the first motor 34.

Thus, the gear portion 33 is controlled in its rotation by the first motor 34, whereby the supporting member 32 is rotated in the arrow A direction in FIG. 2 and controlled in its rotation.

A pair of second rotating shafts 35 orthogonal to the first rotating shaft 31 are provided at the side panels 322, 322 of the supporting member 32, respectively, so as to be rotatable with respect to the supporting member 32. A camera unit 40 is integrally provided between the pair of second rotating shafts 35, 35. Accordingly, the camera unit 40 is rotatable integrally with the pair of second rotating shafts 35, 35 with respect to the side panels 322.

The second rotating shafts 35, 35 are disposed horizontally, and one of the second rotating shafts 35 is provided with a gear portion 36 at the tip end thereof. The gear portion 36 rotates integrally with the second rotating shafts 35.

A second motor 37 is attached to the supporting member 32. A gear 372 meshing with the gear portion 36 is attached to the rotating shaft 371 of the second motor 37. Since the gear portion 36 is controlled by the second motor 37, the camera unit 40 is rotated in the upper/lower direction within a vertical plane and controlled in its rotation (see an arrow B).

Figure 3:
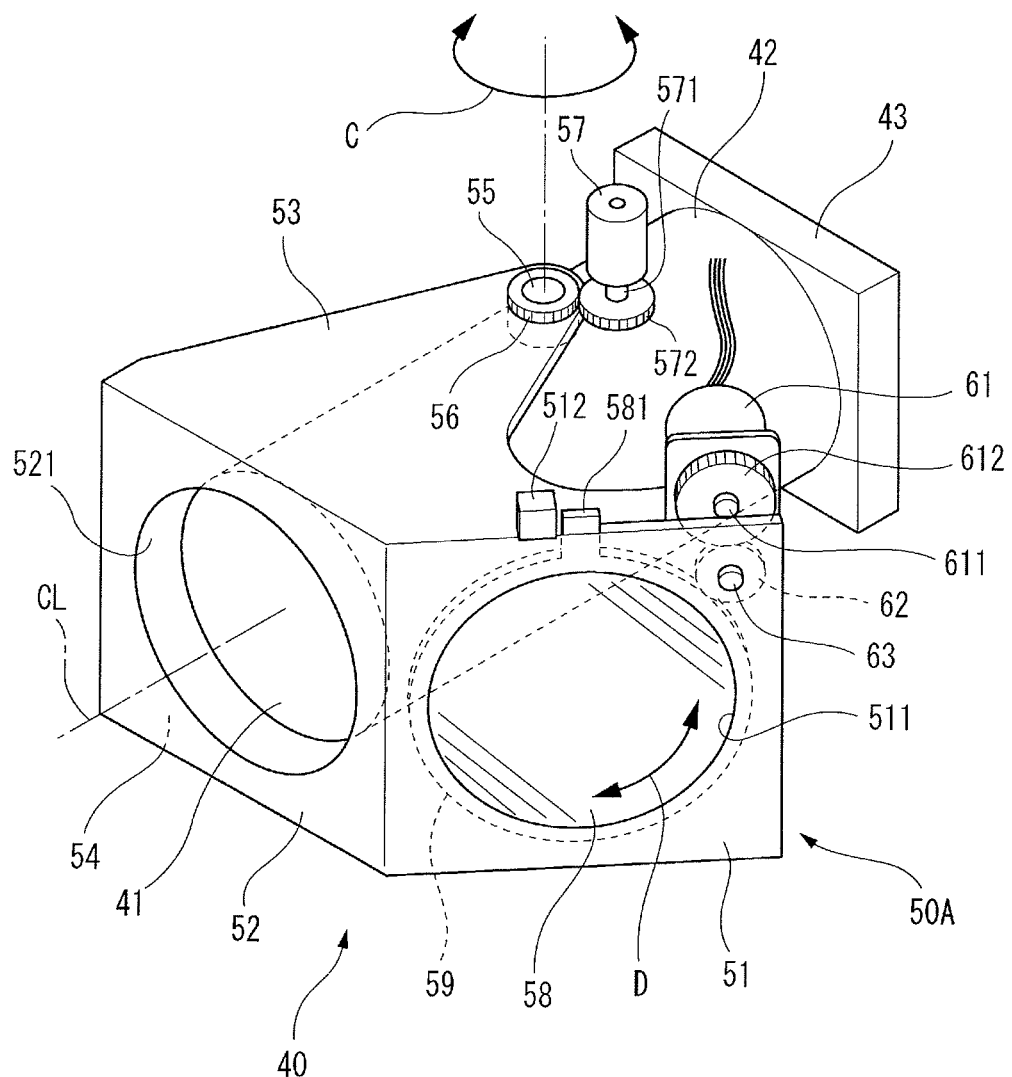
FIG. 3 is a perspective view of the camera apparatus seen from the upper direction thereof.

As shown in FIG. 3, the camera unit 40 has a tubular body 42 for housing a lens 41 and an imaging device 43. In the imaging device 43, a light beam transmitted within the tubular body 42 is imaged and converted into an electric signal.

A polarization filter unit 50A is attached to the front surface (subject to be imaged side) of the tubular body 42. The polarization filter unit 50A has a pair of light transmission walls 51, 52 coupled so as to cross to each other, and also has a pair of supporting plates 53, 54 for coupling the upper ends of both the light transmission walls 51, 52 and coupling the lower ends thereof, respectively.

The polarization filter unit 50A is supported so as to be rotatable in a direction shown by an arrow C with respect to the tubular body 42, by a pair of third rotating shafts 55 (lower side one is omitted in FIG. 3) provided at the upper and lower supporting plates 53, 54, respectively.

Each of the pair of third rotating shafts 55 is provided toward the outside from the external surface of the tubular body 42 so as to be orthogonal with respect to the center axis (imaging axis line) CL of the tubular body 42. The third rotating shafts 55 penetrate the supporting plates 53, 54 and protrude therefrom, respectively.

A gear portion 56 is provided so as to rotate integrally with the supporting member 53, at the periphery of the third rotating shaft 55 protruding to the outside (upper side in FIG. 3) of the supporting plate 53.

A third motor 57 is attached to the tubular body 42. A gear 572 meshing with the gear portion 56 is attached to the rotating shaft 571 of the third motor 57. The gear portion 56 is rotated in the arrow C direction in FIG. 3 and controlled in its rotation by the third motor 57. Thus, the polarization filter unit 50A rotates in the arrow C direction.

The pair of light transmission walls 51, 52 are provided with openings 511, 521 for passing therethrough a light beam from a subject to be imaged, respectively. A polarization filter 58 is attached to the opening 511 of the light transmission wall 51.

A covering state indicates a state when the front side of the lens 41 as the light incident portion of the camera unit 40 is covered with the polarization filter 58. In contrast, a standby state (state shown in FIG. 3) indicates a state when the polarization filter 58 is removed from the front side of the lens 41.

Thus, the covering state and the standby state can be selected by rotating the polarization filter unit 50A using the third motor 57.

The polarization filter 58 is attached to the opening 511 of the light transmission wall 51 so as to be rotatable in a direction shown by an arrow D in FIG. 3. A stopper 512 is provided at the light transmission wall 51. A projection 581 is provided at the polarization filter 58.

Thus, the polarization filter 58 can be easily positioned at an initial position by abutting the projection 581 against the stopper 512.

A ring-shaped gear portion 59 having a gear at the outer periphery thereof is provided so as to be rotatable, at the periphery of the opening 511 on the rear surface (opposite side surface to a subject to be imaged) of the light transmission wall 51. The gear portion 59 has an opening (not shown) which diameter is larger than that of the opening 511 of the light transmission wall 51. The polarization filter 58 is attached to the opening of the gear portion 59.

In the light transmission wall 51, a gear 62 meshing with the gear portion 59 is supported by a rotating shaft 63 so as to be rotatable.

A fourth motor (polarization filter driving unit) 61 is attached to the light transmission wall 51. A gear 612 meshing with the gear 62 is attached to the rotating shaft 611 of the fourth motor 61.

Thus, the polarization filter 58 is rotated in a direction shown by an arrow D in FIG. 3 and controlled in its rotation by rotating the fourth motor 61. As a result, the angle of the polarization filter 58 is changed to thereby adjust a polarization angle.

Figure 4:
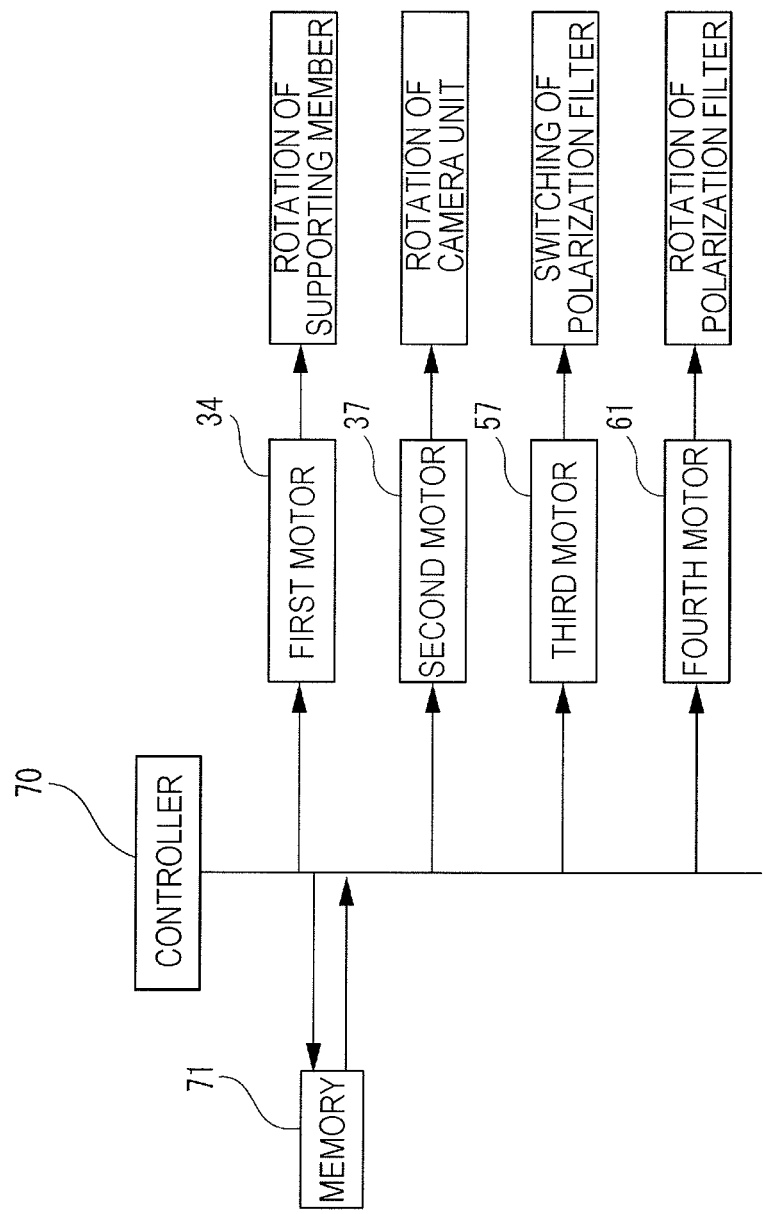
FIG. 4 is a block diagram showing a control system.

As shown in FIG. 4, the first motor 34, the second motor 37, the third motor 57 and the fourth motor 61 are controlled by a controller 70. As a result, the controller 70 controls the rotation of the supporting member 32, the rotation of the camera unit 40 with respect to the supporting member 32, the state of the polarization filter unit 50A and the angle of the polarization filter 58.

The controller 70 is connected with a memory 71. As shown in FIG. 5, the memory 71 stores posture information of the camera unit 40 and polarization filter information of the polarization filter unit 50A with respect to each of preset numbers respectively representing particular imaging directions.

After the camera apparatus 10A is installed, these information is set by a controller (not shown) which is operated by an observer at a place distant from the camera apparatus 10A.

That is, the observer operates the controller to thereby direct the camera unit 40 to a direction desired to be imaged and select at least one of the covering state and the standby state of the polarization filter 58 while checking an image being imaged by the camera unit 40 and displayed on a monitor (not shown). When the observer selects the covering state, the angle of the polarization filter 58 is controlled via the controller so as to obtain good image quality. After completing the adjustment of the posture information representing the imaging direction of the camera unit 40 and the polarization filter information of the polarization filter unit 50A in this manner, the observer operates a set button etc. of the controller to thereby store in the memory 71 the posture information of the camera unit 40 and the polarization filter information of the polarization filter unit 50A together with the preset number.

This operation is repeatedly performed from the preset No. 1 to the preset No. N, thereby preparing a table shown in FIG. 5 and storing the table in the memory 71.

The posture information of the camera unit 40 includes, for example, first angular information P around the first rotating shaft 31 of the supporting member 32 with respect to the camera body 20, second angular information T around the second rotating shaft 35 of the camera unit 40 with respect to the supporting member 32, zoom information Z and focus information F, and so on.

The polarization filter information includes, for example, ON/OFF information for selecting one of the covering state and the standby state of the polarization filter 58 and the polarization angle $\theta$ of the polarization filter 58, and so on.

Next, the explanation will be made as to the control of the camera apparatus 10A by the controller 70.

First, when an observer selects the preset No. 1 by the controller, the controller 70 controls the camera unit 40 to direct toward a subject to be imaged (a front door, for example) corresponding to the preset No. 1 to start the imaging. That is, the controller 70 controls the first motor 34 to rotate the supporting member 32 and to stop it at a first angular position P1. The controller 70 also controls the second motor 37 to rotate the camera unit 40 and to stop it at a second angular position T1. Simultaneously, the controller 70 moves the zoom position and the focus position of the camera unit 40 to a zoom position Z1 and a focus position F1, respectively.

Further, the controller 70 controls the third motor 57 to select the state of the polarization filter 58. In an example of FIG. 5, the standby state (OFF) is selected. In this case, since the polarization filter 58 is not used, the control of the polarization angle $\theta$ using the fourth motor 61 is not required.

Next, when the observer selects the preset No. 2 by the controller 70, the controller 70 controls the camera unit 40 to direct toward a subject to be imaged (a front desk, for example) corresponding to the preset No. 2 to start the imaging. That is, the controller 70 controls the first motor 34 to rotate the supporting member 32 and to stop it at a first angular position P2. The controller 70 also controls the second motor 37 to rotate the camera unit 40 and to stop it at a second angular position T2. Simultaneously, the controller 70 moves the zoom position and the focus position of the camera unit 40 to a zoom position Z2 and a focus position F2, respectively.

Further, the controller 70 controls the third motor 57 to select the state of the polarization filter 58. In the example of FIG. 5, the controller selects the covering state (ON) and controls the fourth motor 61 to adjust the polarization angle of the polarization filter 58 to $\theta 2$.

Figure 6A:
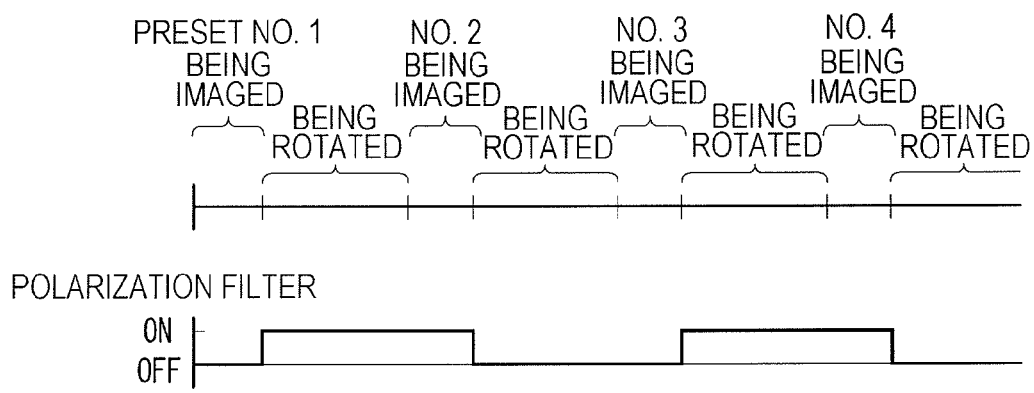
FIG. 6A is a timing chart showing a case where a polarization filter unit is set based on polarization filter information while rotating the camera unit based on posture information.

As shown in FIG. 6A, the controller 70 can simultaneously set the polarization filter 58 by operating the third motor 57 and the fourth motor 61, while rotating the camera unit 40 by the first motor 34 and the second motor 37.

Figure 6B:
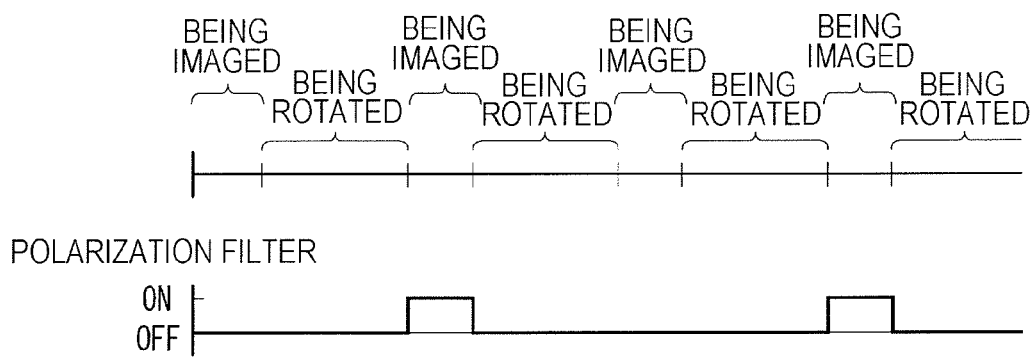
FIG. 6B is a timing chart showing a case where the polarization filter unit is set based on the polarization filter information after rotating the camera unit based on the posture information.

Alternatively, as shown in FIG. 6B, the controller 70 can set the polarization filter 58 by operating the third motor 57 and the fourth motor 61, after completing the rotation of the camera unit 40 by the first motor 34 and the second motor 37.

The actions and effects of the camera apparatus 10A according to the first embodiment will be explained.

In the camera apparatus 10A, the camera body 20 attached to the ceiling surface 11 has the supporting member 32 which is rotatable around the first rotating shaft 31 orthogonal to the ceiling surface 11. The camera unit 40 rotatable around the second rotating shaft 35 orthogonal to the first rotating shaft 31 is attached to the supporting member 32. The polarization filter unit 50A is attached to the camera unit 40. The polarization filter unit 50A is configured to be selectable one of the covering state of covering the light incident portion of the camera unit 40 with the polarization filter 58 and the standby state of removing the polarization filter 58 from the light incident portion.

The camera apparatus 10A has the controller 70 for controlling the rotation of the supporting member 32 with respect to the camera body 20, the rotation of the camera unit 40 with respect to the supporting member 32, and the state of the polarization filter 58. Further, the camera apparatus 10A has the memory 71 which stores the plural pieces of posture information including the imaging directions of the camera unit 40. The memory 71 stores the plural pieces of posture information including the first angular information representing the direction information of the camera unit 40 around the first rotating shaft and the second angular information representing the direction information of the camera unit 40 with respect to the base body 20 around the second rotating shaft 35. Further, the memory 71 also stores the polarization filter information representing one of the covering state and the standby state.

The controller 70 controls the direction of the camera unit 40 based on the posture information stored in the memory 71 and also controls the polarization filter 58 based on the polarization filter information stored in the memory 71 to thereby switch the ON/OFF state of the polarization filter.

In this manner, the posture information and the polarization filter information with respect to subjects to be imaged is stored in the memory 71 in advance, and at the time of imaging the subject to be imaged, the controller 70 reads information relating to the subject to be imaged from the memory 71 to thereby perform the settings. Thus, the subject to be imaged can be imaged in a short time.

Further, since the polarization filter 58 rotates around the center axis CL of the camera unit 40 by the fourth motor 61, the polarization angle θ can be adjusted easily and the imaging can be performed with a suitable polarization angle.

Second Embodiment

Next, the explanation will be made as to a camera apparatus according to a second embodiment of the present invention.

In this embodiment, portions common to those of the camera apparatus 10A according to the first embodiment are referred to by the common symbols, with duplicated explanation thereof being omitted.

Figure 7:
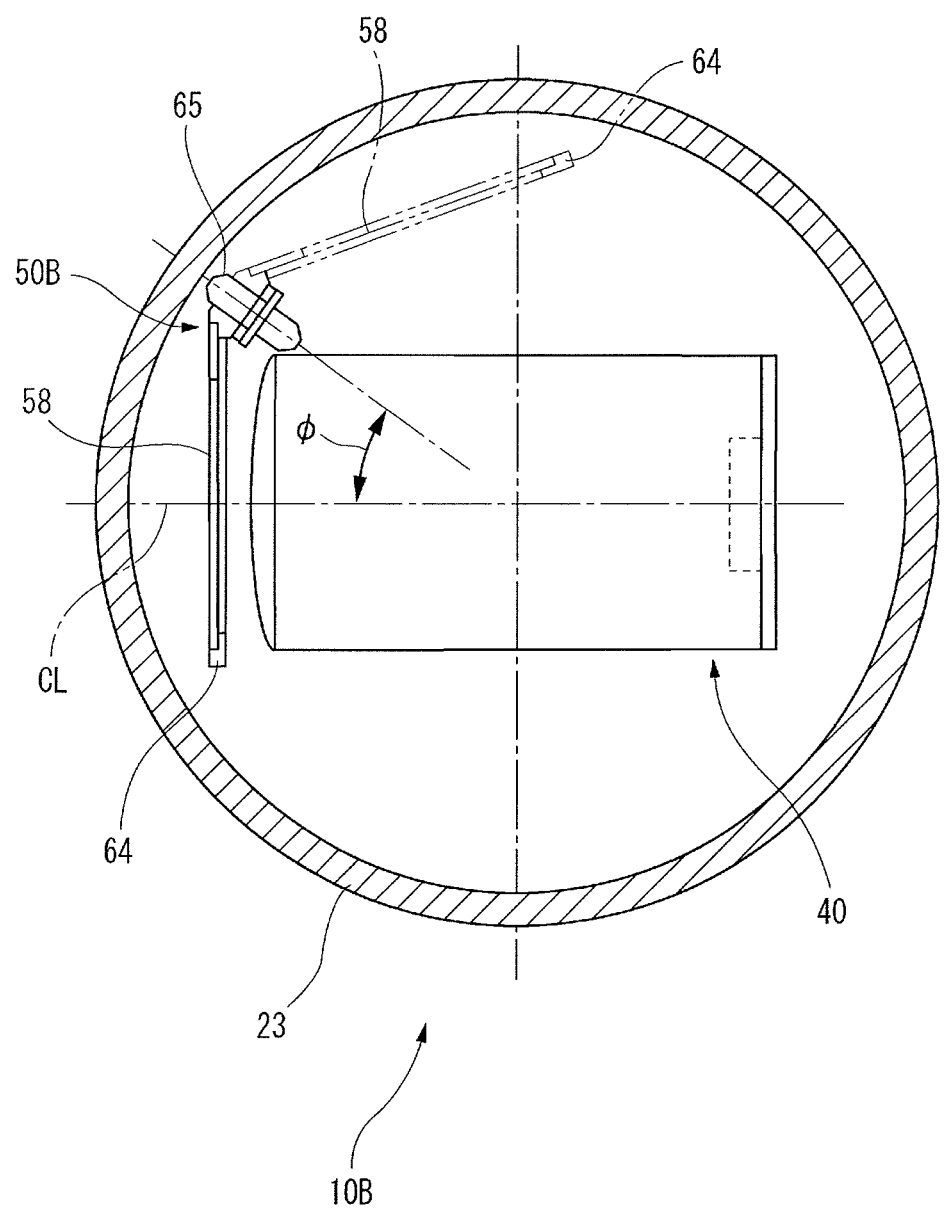
FIG. 7 is a bottom view of a camera unit and a polarization filter unit in a camera apparatus seen from the lower direction thereof according to a second embodiment of the present invention.
Figure 8:
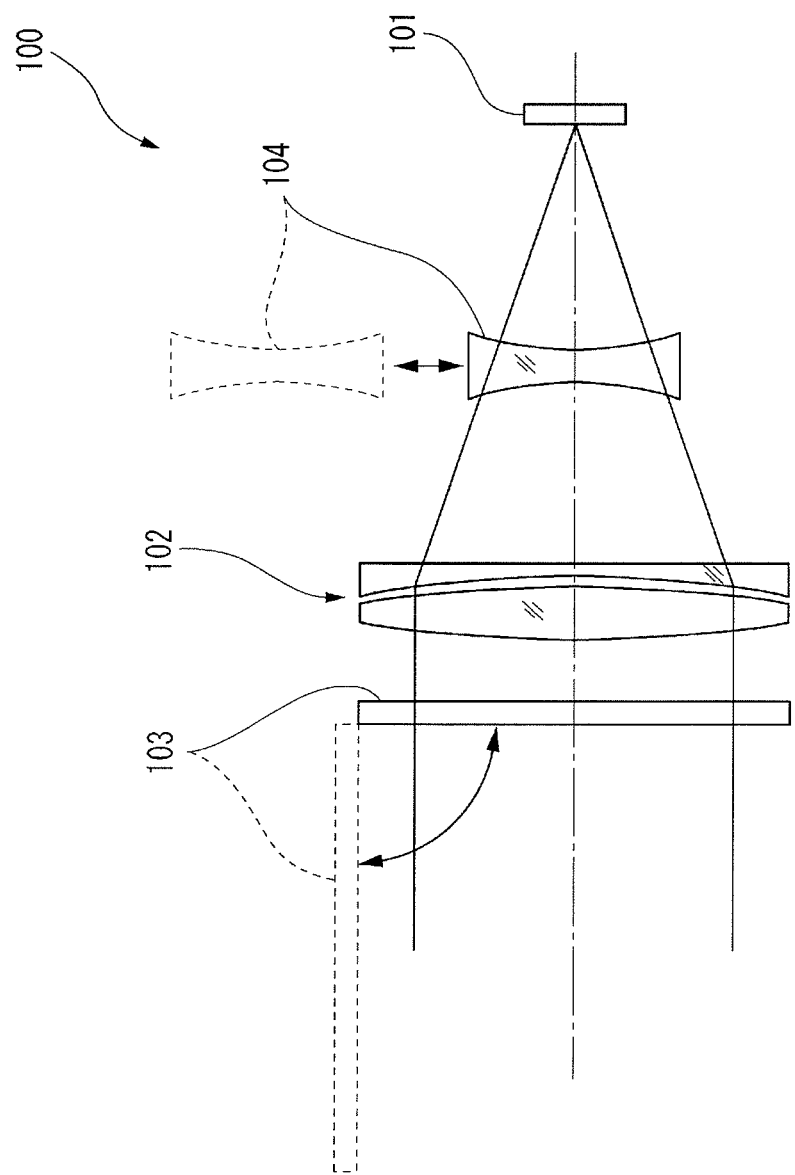
FIG. 8 is a schematic configuration showing the optical system of a CCD camera mounted on a vehicle of a related art.

As shown in FIG. 7, in a camera apparatus 10B according to the second embodiment of the present invention, a polarization filter unit 50B has a polarization filter holding plate 64 provided with the polarization filter 58. The polarization filter holding plate 64 is configured in a disc shape, for example, and has a light-transmission opening (not shown) at the center thereof.

The polarization filter holding plate 64 is held at its one end by a rotation shaft 65 which is inclined by an angle φ with respect to the center axis CL of the camera unit 40. The rotation shaft 65 is rotated by the third motor (not shown).

Thus, the polarization filter holding plate 64 can selectively take one of the covering state (shown by a steady line in FIG. 7) and the standby state (shown by a two-dot chain line in FIG. 7).

The polarization filter 58 can be rotated by the fourth motor (not shown).

According to the camera apparatus 10B of the second embodiment explained above, like the camera apparatus 10A of the aforesaid first embodiment, a subject to be imaged can be imaged in a short time.

The camera apparatus according to the present invention is not limited to the aforesaid embodiments and can be suitably modified and improved, for example.

As an example, although the explanation is made as to the case that each of the camera apparatuses 10A, 10B is attached to the ceiling surface 11 in the embodiments, the camera apparatus may be attached to a wall in the present invention.

Further, the filter used in the present invention is not limited to the polarization filter 58 but may be other filter such as an ND (Neutral Density) filter. Further, in the present invention, only one of the first motor for rotating the camera unit 40 in the horizontal direction and the second motor for rotting it in the upper/lower direction may be used. When the camera is fixed in the zoom position or the focus position, the posture information shown in FIG. 5 may include panning and tilt, or either one.

The present application is based on and claims the benefits of Japanese patent applications No. 2013-33649 filed on Feb. 22, 2013 and No. 2013-252902 filed on Dec. 6, 2013, the contents of which are incorporated herein by reference in its entirety.

What is claimed is:

1. A camera apparatus comprising:
a rotatable camera that includes a light incident surface;
a polarization filter configured to move between a covering state and a standby state, wherein the polarization filter covers the light incident surface of the rotatable camera in the covering state, and the filter does not cover the light incident surface in the standby state;
a controller configured to control a rotation of the rotatable camera and a state of the filter; and
a memory which stores a plurality of preset information items, each preset information item including a posture information, including a direction of the rotatable camera, and a filter information related with each other, the filter information including a filter ON/OFF state and a polarization angle of the polarization filter related with each other, the filter ON/OFF state representing at least one of the covering state and the standby state of the polarization filter, wherein
the controller receives a selection of a preset information item from the plurality of preset information items stored in the memory, controls the direction of the rotatable camera based on the direction of the rotatable camera in the selected preset information item, and controls the polarization filter based on the filter information related with the direction of the rotatable camera in the selected preset information item, and
in controlling the polarization filter, the controller switches the polarization filter to one of the covering state and the standby state based on the filter ON/OFF state in the selected preset information item, and adjusts the polarization angle of the polarization filter based on the polarization angle in the selected preset information item, when the filter ON/OFF state in the selected preset information item indicates the covering state.

2. The camera apparatus according to claim 1, wherein the rotatable camera is rotatable at least in two directions.

3. The camera apparatus according to claim 1, wherein the controller adjusts the polarization angle of the polarization filter, by rotating the polarization filter about an imaging axis of the rotatable camera based on the polarization angle of the polarization filter in the selected preset information item, when the filter ON/OFF state in the selected preset information item indicates the covering state.

4. The camera apparatus according to claim 3, wherein the polarization angle in the selected preset information item is indicated by a filter angle of the polarization filter with respect to a reference angle of the polarization filter.

5. A method of controlling a camera apparatus including a rotatable camera and a polarization filter, the method comprising:
causing the polarization filter to cover a light incident surface of the rotatable camera in a covering state and not to cover the light incident surface in a standby state;
storing a plurality of preset information items, each preset information item including a posture information, including a direction of the rotatable camera, and a filter information related with each other, the filter information including a filter ON/OFF state and a polarization angle of the polarization filter related with each other, the filter ON/OFF state representing at least one of the covering state and the standby state of the polarization filter;
receiving a selection of a preset information item from the plurality of preset information items stored in a memory;
controlling the direction of the rotatable camera based on the direction of the rotatable camera in the selected preset information item, and
controlling the polarization filter based on the filter information related with the direction of the rotatable camera in the selected preset information item,
wherein the controlling the polarization filter comprises:
switching the polarization filter to one of the covering state and the standby state based on the filter ON/OFF state in the selected preset information item, and
adjusting the polarization angle of the polarization filter based on the polarization angle in the selected preset information item, when the filter ON/OFF state in the selected preset information item indicates the covering state.

6. The camera apparatus according to claim 1, wherein the light incident surface includes at least part of a lens.

7. A camera apparatus comprising:
a movable camera that includes a lens receiving light from outside the movable camera;
a movable polarization filter that covers the lens in a covering state and does not cover the lens in a standby state;
a memory that stores a plurality of filter information, each of which at least defines a filter ON/OFF state and a polarization angle of the polarization filter related with each other, the filter ON/OFF state corresponding to the covering state or the standby state, and a plurality of posture information, each of which at least defines a camera direction in which the movable camera captures an image, wherein each of the plurality of filter information is related with one of the plurality of posture information; and
a controller that controls the polarization filter, wherein
when the movable camera captures an image in a first direction defined by a first camera direction included in a first posture information of the plurality of posture information stored in the memory,
the controller switches the polarization filter to one of the covering state and the standby state in accordance with a first filter ON/OFF state defined in a first filter information of the plurality of filter information stored in the memory, the first filter information being related with the first posture information including the first camera direction stored in the memory, and
the controller adjusts the polarization angle of the polarization filter in accordance with a first polarization angle defined in the first filter information related with the first posture information including the first camera direction, when the filter ON/OFF state in the first filter information indicates the covering state.

8. The camera apparatus according to claim 7, wherein
in the covering state, the controller controls the polarization filter to move to a first position where the polarization filter covers the lens,
in the standby state, the controller controls the polarization filter to move to a second position where the polarization filter does not cover the lens.

9. The camera apparatus according to claim 7, wherein
when the controller changes the camera direction of the movable camera from the first direction to a second direction defined by a second camera direction in a second posture information of the plurality of posture information stored in the memory, the controller controls the polarization filter in accordance with a second filter information of the plurality of filter information stored in the memory, the second filter information being related with the second posture information including the second camera direction stored in the memory.

10. The camera apparatus according to claim 9, wherein while the controller changes the camera direction of the movable camera from the first direction to the second direction, the controller changes the polarization filter from a first state defined by the filter ON/OFF state in the first filter information to a second state defined by the filter ON/OFF state in the second filter information.

11. The camera apparatus according to claim 9, wherein after the controller has changed the camera direction of the movable camera from the first direction to the second direction, the controller changes the polarization filter from a first state defined by the filter ON/OFF state in the first filter information to a second state defined by the filter ON/OFF state in the second filter information.

12. The camera apparatus according to claim 9, wherein when both the first filter information and the second filter information define one of the covering state and the standby state, the controller maintains a position of the polarization filter relative to the movable camera in changing the camera direction of the movable camera from the first direction to the second direction.

13. The camera apparatus according to claim 9, wherein when the first filter information defines the covering state and the second filter information defines the standby state, the controller changes a position of the polarization filter from where the filter covers the lens to where the filter does not cover the lens.

14. The camera apparatus according to claim 7, wherein the first posture information further defines a zoom position and a focus position.

* * * * *